(12) United States Patent
Malvankar et al.

(10) Patent No.: US 11,520,564 B2
(45) Date of Patent: Dec. 6, 2022

(54) INTELLIGENT RECOMMENDATIONS FOR PROGRAM CODE

(71) Applicant: International Business Machines Corporation, Armonk, NY (US)

(72) Inventors: Abhishek Malvankar, White Plains, NY (US); Sara Rosenthal, Spring Valley, NY (US); Carlos A. Fonseca, LaGrangeville, NY (US); Naga A. Ayachitula, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 25 days.

(21) Appl. No.: 17/153,504

(22) Filed: Jan. 20, 2021

(65) Prior Publication Data

US 2022/0229639 A1    Jul. 21, 2022

(51) Int. Cl.
*G06F 9/44* (2018.01)
*G06F 8/33* (2018.01)
*G06F 16/28* (2019.01)

(52) U.S. Cl.
CPC .............. *G06F 8/33* (2013.01); *G06F 16/285* (2019.01)

(58) Field of Classification Search
CPC ................................ G06F 8/33; G06F 16/285
USPC ................. 717/101–103, 106–108, 120–121
See application file for complete search history.

(56) References Cited

U.S. PATENT DOCUMENTS

| | | | |
|---|---|---|---|
| 8,560,465 B2 | 10/2013 | Jeong et al. | |
| 9,678,727 B1 | 6/2017 | Chaffin | |
| 10,142,204 B2 * | 11/2018 | Nickolov | ............ H04L 41/0869 |
| 10,616,370 B2 | 4/2020 | Bardhan | |
| 2003/0056195 A1 | 3/2003 | Hunt | |

(Continued)

FOREIGN PATENT DOCUMENTS

| | | |
|---|---|---|
| CN | 108304941 | 7/2018 |
| CN | 109617711 | 4/2019 |

(Continued)

OTHER PUBLICATIONS

James Beswick, "Optimizing the cost of serverless web applications", Oct. 2020, AWS Compute Blog, retrieved from https://aws.amazon.com/ , 9 pages. (Year: 2020).*

(Continued)

*Primary Examiner* — Ted T. Vo

(74) *Attorney, Agent, or Firm* — Amin, Turocy & Watson, LLP

(57) ABSTRACT

Embodiments are provided for intelligent recommendations for program code. In some embodiments, a system can include a processor that executes computer-executable components stored in memory. The computer-executable components can include an evaluation component that determines that first program code pertains to a defined category representing a defined cost to execute the first program code by a cloud computing service. The computer-executable components also can include a recommendation component that generates a recommendation for second program code that satisfies a similarity criterion with respect to the first program code. The second program code pertains to a category representing a cost to execute the second program code by the cloud computing service, where the cost is less than the defined cost.

20 Claims, 11 Drawing Sheets

(56) References Cited

U.S. PATENT DOCUMENTS

| | | | |
|---|---|---|---|
| 2005/0144226 A1 | 6/2005 | Purewal | |
| 2021/0306233 A1* | 9/2021 | Keller | H04L 41/5048 |
| 2022/0012118 A1* | 1/2022 | Kelly | G06F 9/546 |

FOREIGN PATENT DOCUMENTS

| | | |
|---|---|---|
| CN | 109657804 | 4/2019 |
| CN | 110941421 | 3/2020 |
| EP | 1503295 | 2/2005 |
| EP | 2823601 | 1/2015 |
| WO | 2013134060 | 9/2013 |

OTHER PUBLICATIONS

Alieu Jallow., "Cloud-Metric: A Cost Effective Application Development Framework for Cloud Infrastructures", 2016, Uppsala University, Sweden, 62 pages. (Year: 2016).*

Elgamal et al., "Costless: Optimizing Cost of Serverless Computing through Function Fusion and Placement", 2018, IEEE, pp. 300-312. (Year: 2018).*

Scott Henninger, "Retrieving Software Objects in an Example-based Programming Environment", 1991, ACM, pp. 251-260. (Year: 1991).*

Missinato, "Deep coding: when the machine learns to code by itself," Spindox—Digital Soul, Nov. 12, 2018, 5 pages.

Liu et al., "Neural Code Completion," Computer Science, 2017, 14 pages.

Ostendorff et al., "Enriching BERT with Knowledge Graph Embeddings for Document Classification," arXiv:1909.08402v1 [cs.CL] Sep. 18, 2019, 8 pages.

Mell et al., "The NIST Definition of Cloud Computing," Recommendations of the National Institute of Standards and Technology, NIST Special Publication 800-145, Sep. 2011, 7 pages.

Long, "src-d/datasets," https://github.com/src-d/datasets/tree/master/ReviewComments, Mar. 26, 2019, 2 pages.

* cited by examiner

```
import boto as s3 for i in range (epochs):
        data = s3.getData(bucket_name, training_data)
```

FIG. 2A

```
import discovery as was classify_samples #a list to classify the samples.

for i in classify_samples:
        instance.classify
```

FIG. 2B

| Program Code 510 | Charge Features 520 | Label 530 | Typical Cost 540 | Actual Cost 550 | Comment 560 |
|---|---|---|---|---|---|
| import boto as s3　512<br><br>for i in range (1000):<br>　s3.getObject('bucket_name','data') | object_store, charge_per_call, charge | HIGH | 1 cent per call | $1 per call | Avoid reloading data in a loop to save costs |
| import tensorflow as tf　514<br><br>checkpoint_callback =<br>ModelCheckpoint(<br>　filepath, monitor='val_accuracy',<br>　verbose=1,<br>　save_best_only=False,<br>　save_weights_only=False,<br>　save_frequency=1) | tensorflow, charge_per_che ckpoint, charge | HIGH | 5 cent per call | $1.2 per call | Avoid saving checkpoints often to limit disk/object store usage |
| import discovery as was　516<br><br>classify_samples #a list to classify the samples<br><br>for I in classify_sample:<br>　Instance_classify | discovery, charge_flat_per_ month, charge | NORMAL | $1000/month | $1000/month | Access to WDS looks good for the account |

FIG. 5

INTELLIGENT RECOMMENDATIONS FOR PROGRAM CODE

BACKGROUND

The subject disclosure relates to recommendations for program code. The program code can be embodied in a set of code instructions arranged in particular fashion to provide defined functionality. When compiled and executed, the set of code instructions can provide the defined functionality. In some cases, the program code can be embodied in a reusable segment of a few code instructions. The program code can access cloud computing services in order to provide the defined functionality. A cloud computing service can provide one or several computational tools to implement specific functionality, such as data storage, natural language processing, classification tasks, recommendation engines, search algorithms, or similar functionalities. For example, program code can use various cloud computing services to build a machine learning (ML) model or another type of software application (such as a business logic application) in a cloud or across multiple cloud landscapes.

Different forms of program code accessing one or several cloud computing services can be generated by different parties. As such, program code can use the cloud computing service to accomplish a computational task in a particular manner, and another program code can use the cloud computing service to accomplish the same computational task in a different manner. That computational task can include obtaining data from data storage, for example. Accordingly, a computing platform that provides the cloud computing service can receive various arrangements of program code. One of those arrangements can execute at a first level of efficiency and another one of those arrangements can execute at second level of efficiency. As such, a same computational task can be accomplished at different levels of efficiency depending on how the program code is arranged in order to access the cloud computing service.

For a given computational task, inefficient program code can result in unwarranted expenses of time and other types of resources. More importantly, inefficient program code can result in poor utilization of computing resources of the computing platform that provides cloud computing services. Poor utilization of those resources can create operational issues at the computing platform, such as network congestions, blockade of computing resources to other parties, extended processing unit time, a combination of those issues, or similar issues. Therefore, improved technologies for the identification or replacement, or both, of inefficient program code may be desired.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later.

According to an embodiment, a system is provided. The system includes a processor that executes computer-executable components stored in memory. The computer-executable components include an evaluation component that determines that first program code pertains to a defined category representing a defined cost to execute the first program code by a cloud computing service. The computer-executable components also can include a recommendation component that generates a recommendation for second program code that satisfies a similarity criterion with respect to the first program code. The second program code pertains to a category representing a cost to execute the second program code by the cloud computing service, where the cost is less than the defined cost. By providing a recommendation for less costly, more efficient program code, computing resources of a computing platform that provides the cloud computing service can be used more efficiently.

In addition, or in other embodiments, the first program code can include a first reusable segment of program code and the second program code can include a second reusable segment of program code. The computer-executable components can further include a report component that sends the second program code to a user device. Further, or in yet other embodiments, the report component can send a notification of the second program code being available. An advantage of providing such notifications can include avoidance of inefficient utilization of computing resources at the computing platform.

According to another embodiment, a computer-implemented method is provided. The computer-implemented method can include determining, by a computing system operatively coupled to a processor, that first program code pertains to a defined category representing a defined cost to execute the first program code by a cloud computing service. The computer-implemented method also can include generating, by the computing system, a recommendation for second program code that satisfies a similarity criterion with respect to the first program code. The second program code pertains to a category representing a cost to execute the second program code by the cloud computing service, where the cost is less than the defined cost. By providing a recommendation for less costly, more efficient program code, computing resources of a computing platform that provides the cloud computing service can be used more efficiently.

According to a further embodiment, a computer program product for provision of recommendations for program code. The computer program product includes a computer-readable storage medium having program instructions embodied therewith. The program instructions are executable by a processor to cause the processor to determine, by the processor, that first program code pertains to a defined category representing a defined cost to execute the first program code by a cloud computing service. The program instructions also are executable by the processor to cause the processor to generate, by the processor, a recommendation for second program code that satisfies a similarity criterion with respect to the first program code. The second program code pertains to a category representing a cost to execute the second program code by the cloud computing service, where the cost is less than the defined cost. By providing a recommendation for less costly, more efficient program code, computing resources of a computing platform that provides the cloud computing service can be used more efficiently.

BRIEF DESCRIPTION OF THE DRAWINGS

FIG. 2A illustrates a non-limiting example of program code, in accordance with one or more embodiments described herein.

FIG. 2B illustrates another non-limiting example of program code, in accordance with one or more embodiments described herein.

FIG. 5 illustrates non-limiting examples of elements of a dataset of labeled data to train a classification model using machine-learning techniques, in accordance with one or more embodiments described herein.

DETAILED DESCRIPTION

Figure 1:
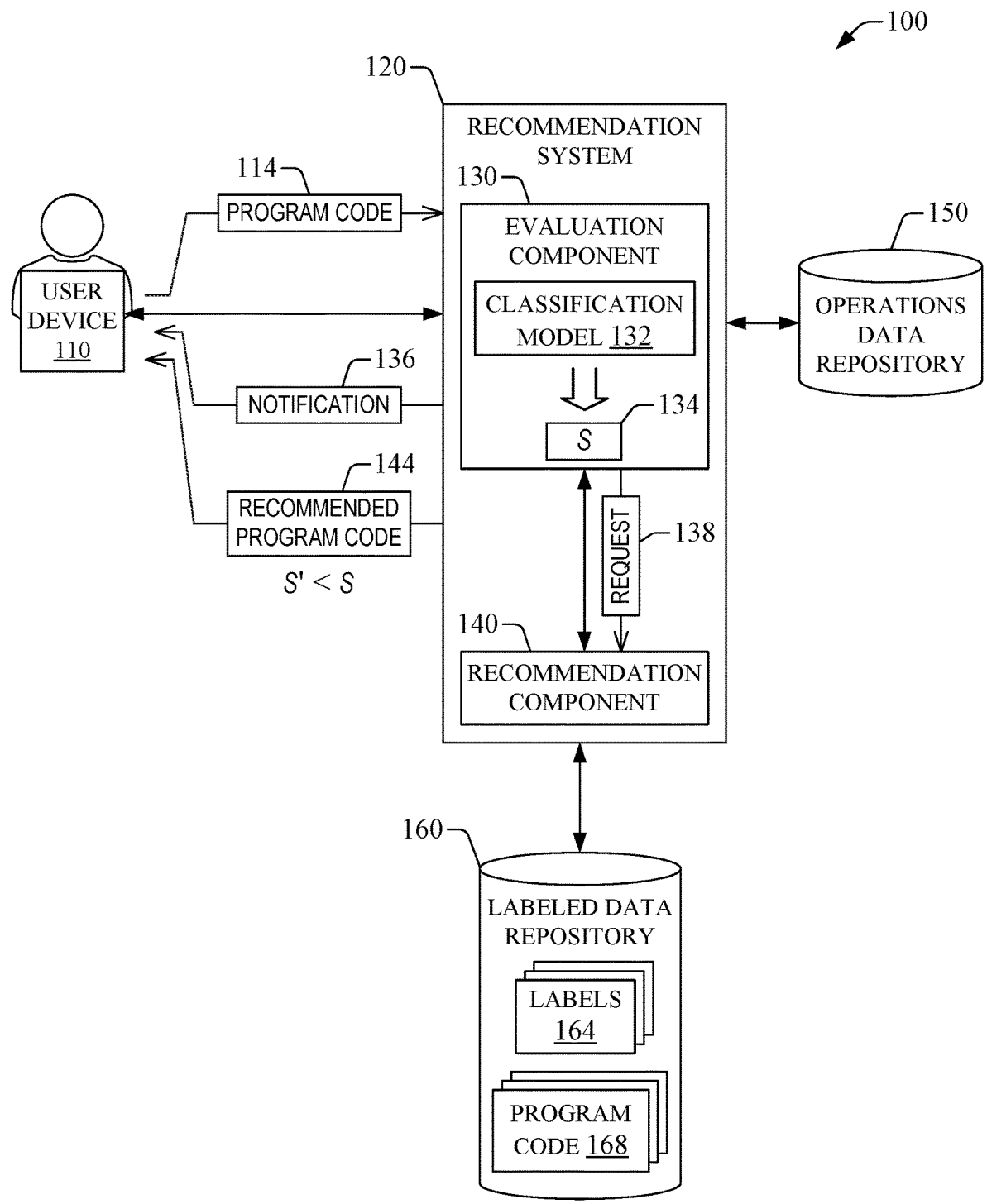
FIG. 1 illustrates a non-limiting example of an operational environment for intelligent recommendations for program code, in accordance with one or more embodiments described herein.

Embodiments of this disclosure address the issue of identification and replacement of inefficient program code that accesses a cloud computing service. In some cases, can be embodied in a reusable segment of code instructions in a particular arrangement. Embodiments of the disclosure can evaluate computational efficiency of program code by using cost of execution of the program code as a proxy for computational efficiency. To that end, embodiments of the disclosure provide a classification model that can designate the program code as pertaining to a particular cost category from a group of cost categories. The group of cost categories can include a subset of preferred cost categories and another subset of non-preferred cost categories. A preferred cost category represents a class of program code that incurs satisfactory costs as a result of being executed in a computing platform that provides a cloud computing service. Here, a satisfactory cost can be a typical execution cost across a large number of arrangements of program code deemed acceptable by a pool of reviewer devices. A non-preferred cost category represents a class of program code that incurs costs greater than a satisfactory cost. The classification model can be trained on large amounts of labeled data using machine-learning techniques.

Evaluation of program code can result in the program code being deemed inefficient. In such case, embodiments of the disclosure can supply a notification of inefficient code. The notification can be supplied prior to execution of the program code at the computing platform that provides the cloud computing service accessed by the program code. In sharp contrast to commonplace approaches or technologies, by providing such a notification, embodiments of this disclosure can permit avoiding inefficient utilization of computing resources at the computing platform. As a result, embodiments of the disclosure can mitigate, or avoid altogether, network congestion, blockade of computing resources, extended processing unit time, or similar issues.

In addition, or in some cases, embodiments of the disclosure can provide a recommendation for program code that can replace particular program code that has been designated as pertaining to a non-preferred cost category and, thus, is deemed inefficient program code. The recommended program code can provide similar, if not the same, functionality as the particular program code. In addition, the recommended program code can be previously classified as pertaining to a preferred cost category and, thus, is deemed efficient program code. Accordingly, the recommended program code represents an intelligent recommendation for program code.

By providing a machine-learning dictated way of recommending program code that access a cloud computing service, embodiments of this disclosure provide several advantages over commonplace approaches and technologies. One of such advantages can include the provision of program code that executes efficiently in a computing platform that provides a cloud computing service. Efficient program code also can reduce energy usage at the computing platform, which can reduce the carbon footprint of the computing platform, thus facilitating the implementation of environmentally friendly computing systems.

Embodiments of this disclosure are illustrated in connection with program code that accesses a cloud computing service and computing platforms that provide the cloud computing service. The disclosure, however, is not limited in that respect. Indeed, the principles of this disclosure can be applied to any type of computer platform that provides computing resources (such as data storage) and/or computational tools that can be shared among a group of computer programs in execution. In those computing platforms, in some cases, execution of a computer program can incur monetary cost.

With reference to the drawings, FIG. 1 illustrates a non-limiting example of an operational environment 100 for intelligent recommendations for program code, in accordance with one or more embodiments described herein. In the operational environment 100, a user device 110 can supply program code 114. The user device 110 can be embodied in a mobile device (e.g., a tablet computer or a laptop computer) or a personal computer, for example. To that end, the user device 110 can execute a software application that permits receiving input information defining the program code 114. Execution of the software application can cause the user device 110 to present a graphical user interface (GUI) or another type of UI where the input information can be entered. The software application can be embodied in a web application (such as a notebook application) or an integrated development environment (IDE), for example. Embodiments described herein are not limited to the user device 110 providing the program code 114. In some embodiments, a server device (not depicted in FIG. 1) can supply the program code 114. The program code 114 can constitute a reusable segment of program code, in some cases. The reusable segment of program code can be referred to as a snippet. The program code 114 can be supplied via one or more network(s). Examples of the program code are illustrated in FIG. 2A and FIG. 2B.

Figure 3:
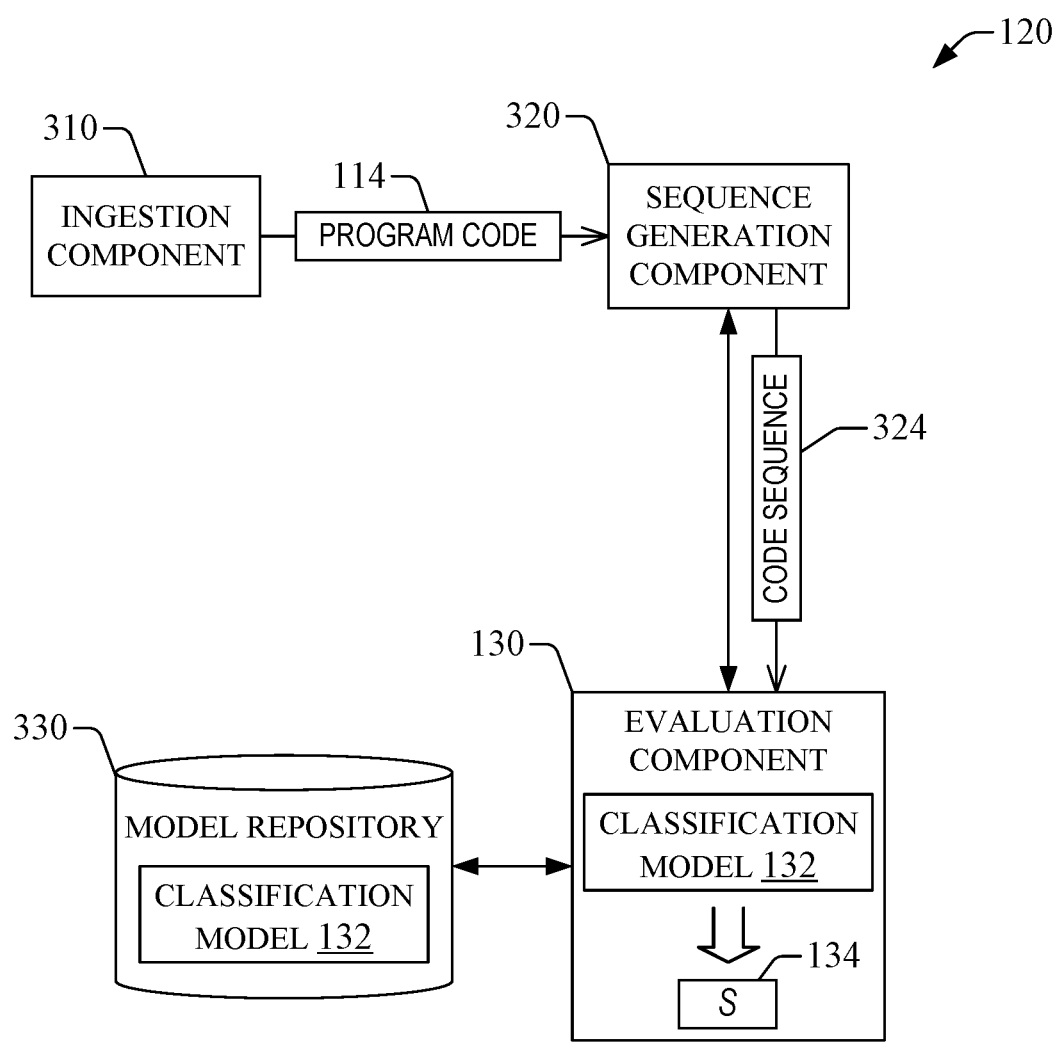
FIG. 3 illustrates a non-limiting example of a computing system for intelligent recommendations for program code, in accordance with one or more embodiments described herein.

The operational environment 100 includes a recommendation system 120 that can receive the program code 114. The recommendation system 120 can then evaluate the computational efficiency of the program code 114 by using cost of execution of the program code 114 as a proxy for computational efficiency. To that point, the recommendation system 120 can include an evaluation component 130 that can assess a cost to execute the program code 114 in a computing platform that provides a cloud computing service. To that end, the evaluation component 130 can obtain a code sequence corresponding to the program code 114. The evaluation component 130 can obtain that code sequence in numerous ways. In some embodiments, as is illustrated in FIG. 3, the recommendation system 120 can include an ingestion component 310 that can receive the program code 114. The ingestion component 310 can send the program code 114 to a sequence generation component 320 that can generate a code sequence 324. The code sequence 324 embodies the code sequence corresponding to the program code 114. The sequence generation component 320 can then send the code sequence 324 to the evaluation component 130.

In some cases, the sequence generation component 320 can generate the code sequence 324 by removing comments from the program code 114, and then forming a string of characters with the remaining instructions in the program code 114. The string of characters constitutes the code sequence 324. The sequence generation component 320 can limit the number of characters included in the string of characters. Thus, the number of characters can be less than, or equal to, a threshold number of characters n (a natural number). In some configurations, the threshold number of characters can be a power of 2; for example, n can be equal to 32, 64, 128, 256, or 512. Here, a comment refers to an annotation having one or several words preceded by a defined character (e.g., "#" or "%") within a line in the program code 114. The annotation explains functionality of the code and/or a purpose of a part of the program code 114.

In addition, as part of evaluating the computational efficiency of the program code 114, the evaluation component 130 also can access data identifying a cloud computing service utilized by the program code 114 and a charge model corresponding to the cloud computing service. In some cases, the data can be conveyed in a vector. As an example, the data can include first data identifying a name of a cloud computing service (MLS, for Machine Learning Service, for example); second data identifying a charge model for the cloud computing service; third data identifying a cost associated with usage of the cloud computing service; and fourth data identifying an expanded version of the name of the cloud computing service. The first data, the second data, the third data, and the fourth data can be conveyed, respectively, in a first item, a second item, a third item, and a fourth item of the vector. Such a vector represents usage charge for the cloud computing service. For purposes of illustration, the vector can be a 4-tuple including an entity name identifying the cloud computing service, where the entity name can be abbreviated; data identifying a charge model; data identifying a usage cost; and an expanded version of the entity name. Namely, u=(entity_name, charge_model, cost, abbr_expanded_as). For example, u=(MLS, per_1000_API_Calls,1_cent_percall, Machine_Learning_Service). As another example, u=(blk, per_month, flat_permonth,block_storage).

The evaluation component 130 can access the data identifying a cloud computing service and charge model from one or several memory devices 150 (referred to as operations data repository 150) shown in FIG. 1. The operations data repository 150 can include first data identifying names of different cloud computing services. The operations data repository 150 also can include second data defining charge models, including service usage charges, such as monthly, per instance, or per 100s or 1000s API call cost.

The various types of data stored in the operations data repository 150 can be specific to a provider of a cloud computing service. Accordingly, data defining a charge model and/or data defining a usage cost can be different for different service providers of the cloud computing service. For example, for a cloud computing service embodied in data storage, a first usage cost can be configured for a first service provider and a second usage cost can be configured for a second service provider. As such, the operations data repository 150 can include first data defining the first usage cost and second data defining the second usage cost. In some embodiments, data retained in the operations data repository 150 can be partitioned according to service provider. Thus, various portions of the operations data repository 150 can be customized to respective service providers. Although the operations data repository 150 is illustrated as being functionally coupled to the recommendation system 120, the disclosure is not limited in that respect. In some embodiments, at least a portion of the operations data repository 150 can be included in the recommendation system 120.

To access data identifying the cloud computing services utilized by the program code 114 and a charge model corresponding to the cloud computing service, in some embodiments, the evaluation component 130 can receive a sequence of one or several statements identifying respective cloud computing services utilized by the program code 114. In addition, or in other embodiments, the evaluation component 130 also can receive data identifying a particular provider of the respective cloud computing services. At least one statement in the sequence of statements can be received from the sequence generation component 320. Such statement(s) can correspond to an "import" statement included in the program code 114, for example. See FIG. 2A and FIG. 2B for examples of "import" statements. The sequence generation component 320 can supply a statement in the sequence of statements by parsing the program code 114 to identify an "import" statement present in the program code 114. The sequence generation component 320 can then generate data defining the import statement and can send that data to the evaluation component 130.

The evaluation component 130 can receive the sequence of one or several statements and can then use each one of the received statement(s) to query the operations data repository 150 (FIG. 1). In response, in some embodiments, the evaluation component 130 can receive a vector identifying at least a cloud computing service utilized by the program code 114 and a charge model corresponding to the cloud computing service, as is described above.

Further, also as part of assessing the cost to execute the program code 114 in the computing platform that provides the cloud computing service, the evaluation component 130 can then apply a classification model 132 to the code sequence and the vector representing usage charge for the service in order to generate a classification attribute 134 for the program code 114. The classification attribute 134 is denoted by S in FIG. 1. As an illustration, the classification model 132 can be embodied in a random forest model, a logistic regression classifier, a convolutional neural network (CNN) model, or a bidirectional encoder representation for transformers (BERT) model. Regardless of its type, the classification model 132 can perform a multi-class classification task in response to being applied to the code sequence and the vector representing usage charge. In some cases, performing the multi-class classification task includes determining multiple weights corresponding to respective categories. One of the determined weights, and corresponding category, can then be selected as an outcome of the classification task.

In some embodiments, the recommendation system 120 can include one or many memory devices 330 (referred to as model repository 330; FIG. 3) retaining the classification model 132. In those embodiments, the evaluation component 130 can obtain the classification model 132 from the model repository 330. In one example, the evaluation component 130 can load the classification model 132 from the model repository 330. The evaluation component 130 can generate the classification attribute 134 by receiving a code sequence (e.g., code sequence 324) corresponding to the program code 114 and further receiving a vector identifying a cost model to access the cloud computing service. The evaluation component 130 can then generate multiple weights by applying the classification model 132 to the code sequence and the vector. A first weight of the multiple weights represents a probability that the code sequence pertains to a first cost category representing a particular cost for accessing the cloud computing service. A second weight of the multiple weights represents a probability that the code sequence pertains to a second cost category representing a second particular cost for accessing the cloud computing service. The evaluation component 130 can then determine that a largest weight of the multiple weights corresponds to the defined category and can assign the classification attribute 134 to a label identifying the defined category.

As mentioned, regardless of its type, the classification model 132 can perform a multi-class classification task in response to being applied to the code sequence and the vector representing usage charge. The classification model 132 can be trained to discern a cost category for a code sequence among a group of cost categories. Accordingly, because the code sequence corresponds to the program code 114, the classification attribute 134 can designate the program code 114 as pertaining to a particular cost category from a group of cost categories. Simply for purposes of illustration, the group of cost categories can include a "Low" category, a "Normal" category, a "Moderate" category, and a "High" category. As such, in some cases, the particular cost category can be the "High" category. In other cases, the particular cost category can be the "Medium" category.

In some cases, the "Normal" category cab be a default category and corresponding label. The "Moderate" category represents arrangements of program code resulting in charges higher than normal. While generating labeled data, a reviewer device can configure such arrangements as "Moderate." The "High" category represents arrangements of program code resulting in charges higher than moderate. While generating labeled data, a reviewer device can configure such arrangements as "High." In contrast, the "Low" category represents arrangements of program code resulting in charges less than "Normal," where those arrangements can constitute program code more efficient than typically expected. While generating labeled data, a reviewer device can configure such arrangements as "Low." Embodiments of this disclosure are not limited to the four cost categories above. More or fewer cost categories also can be contemplated.

In some embodiments, the classification attribute 134 can be embodied in a label that identifies a cost category. In this disclosure, the term "label" refers to an indicator of information, such as a textual indicator, a graphical indicator, an aural indicator, or an indicator that combines at least two of the preceding indicators. For instance, S can contain a string of characters (such as a keyword) that conveys the cost category. Indeed, in one example, the string of characters can be one of "Low," "Normal," "Moderate," or "High." In other embodiments, the classification attribute 134 can be a score. For instance, S can be embodied in a real number in the interval [0,1].

Figure 4:
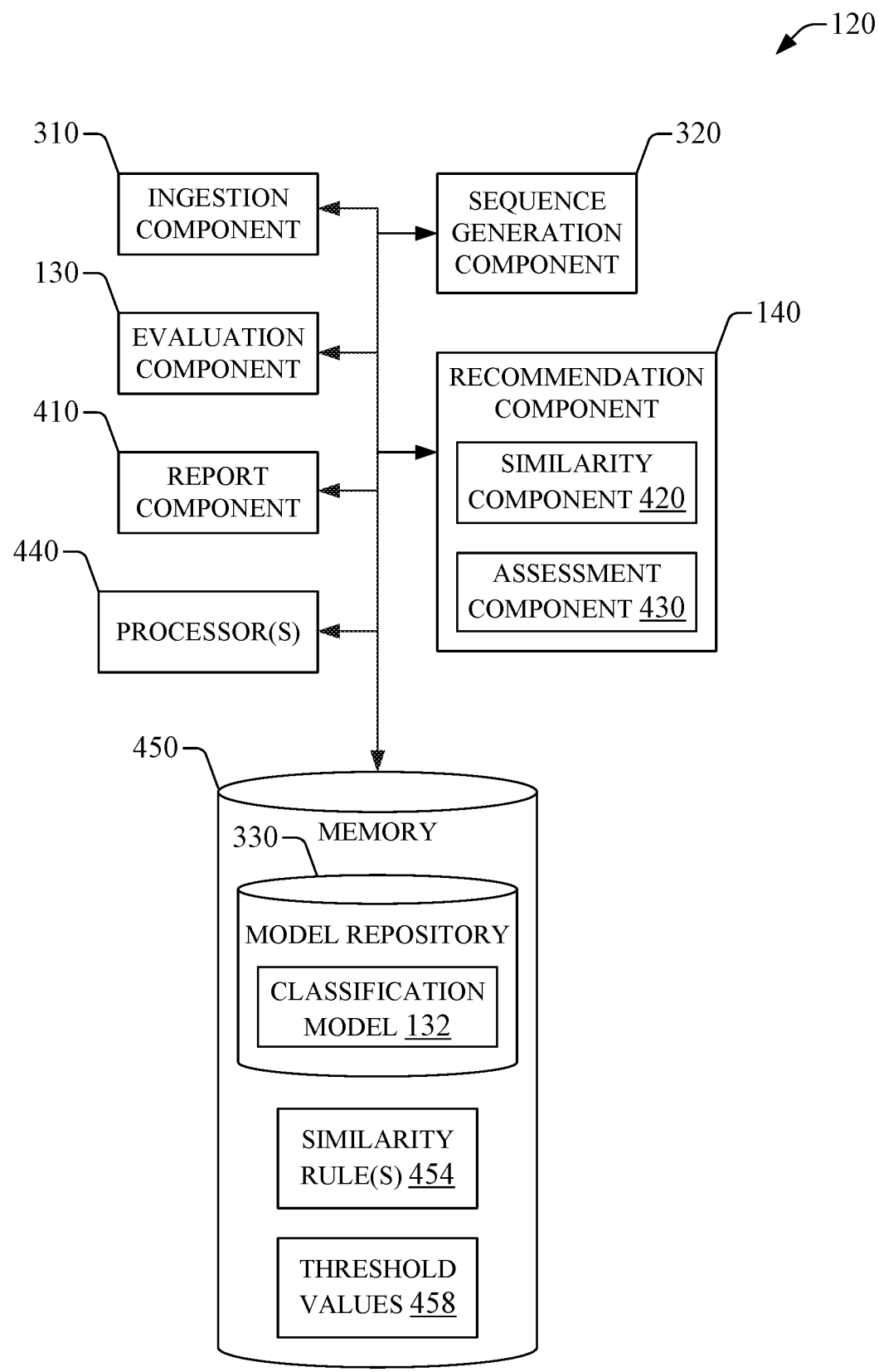
FIG. 4 illustrates another non-limiting example of a computing system for intelligent recommendations for program code, in accordance with one or more embodiments described herein.

The cost to execute the program code 114 can be determined by how efficiently the program code 114 executes in the computing platform that provides one or several cloud computing services. Accordingly, the recommendation system 120 can supply a notification 136 identifying the classification attribute 134 (S) that has been determined for the program code 114. In some cases, the recommendation system 120 can send the notification 136 to the user device 110. By making the notification 136 available to the user device 110, the user device 110 can readily identify an anticipated efficiency of the program code 114 before submission of the program code 114 for execution at the computing platform. Therefore, the user device 110 can prevent execution of inefficient program code in such a computing platform. For example, in a situation in which S indicates that the program code 114 pertains to the "High" category, the program code 114 may not be executed at the cloud computing service. As a result, inefficient utilization of computing resources at the computing platform can be avoided. In some embodiments, as is shown in FIG. 4, the recommendation system 120 can include a report component 410 that can supply the notification 136. As is illustrated in FIG. 4, the recommendation system 120 also can include one or many processors 440, multiple components, and data repositories, including one or many memory devices 450 (referred to as memory 450). The processor(s) 440, the multiple components, and the data repositories can be electrically, optically and/or communicatively coupled to one another.

The notification 136 can be formatted according to one of several communication protocols (such as hypertext markup language (HTML), a representational state transfer (RESTful) protocol, or similar protocols). In some embodiments, the notification 136 can include text identifying the cost category corresponding to the classification attribute 134 (S). In addition, or in other embodiments, the notification 136 can include formatting information defining a text attribute (e.g., color, font, and/or font size) to display the text at a display device. The text attribute can be specific to the cost category. For instance, the text attribute can be color, and the color can be warmer the higher the cost represented by the cost category. As such, for the "High" category, the color can be red and for the "Low" category, the color can be blue. The display device can be integrated into, or functionally coupled to, the user device 110.

Besides supplying notifications, in some embodiments, the recommendation system 120 can use the classification attribute 134 to cause other program code to be recommended. The recommended program code can be similar to the program code 114. The recommended program code also can pertain to a cost category representing a lesser cost than that represented by the particular cost category corresponding to the program code 114. Accordingly, the recommended program code can provide similar, if not the same, functionality than the program code 114 and can execute more efficiently in the computing platform that provides cloud computing service(s).

In some embodiments, to cause the generation of a recommendation for program code 144 (referred to as recommended program code 144 in FIG. 1), the evaluation component 130 can determine if the particular cost category designated by the classification attribute 134 is included in a defined subset of a group of cost categories. As mentioned, in one example, the group of cost categories can include the "Low," "Normal," "Moderate," and "High" categories, and the defined subset of the group of cost categories can include the "Moderate" category and the "High" category. Continuing with the example above, in case the particular cost category is the "Moderate" category or the "High" category, the evaluation component 130 can ascertain that the particular cost category is included in the defined subset of the group of cost categories. In the alternative, in case the particular cost category is the "Low" category or the "Normal" category, the evaluation component 130 can ascertain that the particular category is excluded from the defined subset of the group of cost categories.

Regardless of the composition of the defined subset of the group of cost categories, in some cases, the evaluation component 130 can determine that the program code 114 pertains to a defined category within the defined subset of the group of cost categories. The defined category represents a defined cost to execute the program code 114 by a cloud computing service. As mentioned, the program code 114 can constitute a reusable segment of program code or another type of reusable component.

In response to determining that the program code 114 pertains to the defined category (e.g., "High"), the evaluation component 130 can direct a recommendation component 140 to generate the recommendation for the program code 144. Hence, in some embodiments, the evaluation component 130 can send a recommendation request 138 to the recommendation component 140. The recommendation request 138 can serve as, or can embody, an instruction to generate the recommendation for the program code 144. The recommendation component 140 can generate such a recommendation in response to receiving the recommendation request 138.

The recommended program code 144 can satisfy a similarity criterion with respect to the program code 114, and pertains to a cost category excluded from the defined subset of the group of cost categories. For instance, such a cost category can be the "Low" category. The cost category thus represents a cost to execute the program code 144 by the cloud computing service, where the cost is less than the defined cost to execute the program code 114 by the cloud computing service. The cost category can be designated by a classification attribute S', and the relationship between the cost and defined cost is represented by the relationship S'<S in FIG. 1. In some cases, the recommended program code 144 can constitute another reusable segment of program code or another type of reusable component.

The recommendation component 140 can generate the recommendation for the program code 144 by determining a solution to a matching problem with respect to both the similarity criterion and one or several specific cost categories (e.g., "Low" or "Normal," or both). The solution yields a particular program code that constitutes the recommendation.

More concretely, in some embodiments, the similarity criterion can dictate that a similarity metric be greater than a threshold value. The similarity metric can be defined according to a model to represent program code or a corresponding code sequence. An example of the model can be a bag-of-words model, and the similarity metric can be a number of terms that are common among a first code sequence and a second code sequence. Another example of the model can be a bag-of-tokens model. A token can correspond to a character in the corresponding code sequence, and the similarity metric can be a number of tokens that are common among a first code sequence and a second code sequence. Yet another example of the model can be an embedding vector that the evaluation component 130 can provide to a BERT model or another type of neural network model embodying the classification model 132. The embedding vector embodies a word embedding that represents at least a portion of a code sequence and can be embodied in a d-dimensional vector (d is a natural number). In some cases, d can be of the order of 100, e.g., 100, 200, or 300. The embedding vector can thus represent one or multiple lines of the program code corresponding to the code sequence. In some embodiments, the evaluation generation component 130 can generate such an embedding vector. In other embodiments, the recommendation component 140 (via the similarity component 420 (FIG. 4) for example) can generate the embedding vector. The embedding vector can be generated using a mapping between terms in program code and real numbers, where the real numbers constitute the embedding vector. Such a mapping can be represented by a trained neural network model, in some cases. Embedding vectors for code sequences constitute an embeddings space. The similarity metric can be a Euclidean distance between a first embedding vector and a second embedding vector representing, respectively, a first code sequence and a second code sequence, for example.

To determine such a solution to the matching problem, the recommendation component 140 can select a particular program code from a pool of program codes each pertaining to a cost category included in a set of preferred cost categories. Such a set includes one or several cost categories (e.g., "Low" or "Normal," or both) from the group of cost categories associated with the classification task implemented by the classification model 132. The pool of program codes can be retained in one or several memory devices 160 (referred to as labeled data repository 160). For instance, the pool of program codes can include a subset of program codes 168 retained in the labeled data repository 160. It is noted that in some embodiments, code sequences corresponding to program codes also can be retained in the labeled data repository 160. A respective label of each program code in the pool of program codes also can be retained in the labeled data repository. Such a label designates a cost category. For instance, the labels corresponding to the pool of program codes can include a subset of labels 164 retained in the labeled data repository 160. The particular program code can be a snippet or another type of reusable component, for example.

In addition, also as part of determining the solution to the matching problem, the recommendation engine 140 can then determine a similarity metric for the particular program code. The similarity metric can be one of the metrics described hereinbefore. Further, the recommendation component 140 can compare the similarity metric to the threshold value. A comparison indicating that the similarity metric exceeds the threshold value conveys that the particular program code satisfies the similarity criterion. Thus, the particular program code can embody the recommended program 144. In some embodiments, as is illustrated in FIG. 4, the recommendation component 140 can include a similarity component 420 that can determine the similarity metric. In addition, the recommendation component 140 also can include an assessment component 430 that can compare the similarity metric to the threshold value. The threshold value can be retained in a memory 450, withing threshold values 458. The similarity criterion also can be retained in the memory 450, within one or more similarity rules 454.

After the recommendation for the program code 144 is generated, the recommendation system 120 can supply a notification of the availability of the recommended program code 144. In addition, or in some cases, the recommendation system 120 can supply the recommended program code 144. In some embodiments, the recommendation system 120 can supply the notification and the recommended program code 144 by sending the notification and the recommended program code 144 to the user device 110. In some cases, the notification and/or the recommended program code 144 can be sent to another device remotely located relative to the recommendation system 120. In addition, or in other embodiments, the recommendation system 120 can supply the notification and the program code 144 by causing a display device to present a visual element indicative of cost category of program code 144, for example. The display device can be integrated into, or can be functionally coupled to, the user device 110. As is illustrated in FIG. 4, the recommendation system 120 can include a report component 410 that can supply the notification and the program code 144 in accordance with aspects described herein.

Further, or in yet other embodiments, the recommendation system 120 can supply the notification and recommended program code 144 by retaining the notification and the recommended program code 144 in data storage functionally coupled to the recommendation system 120, and configuring an interface (e.g., an application programming interface (API); not depicted in FIG. 1) to permit access to the retained notification and the recommended program code 144.

As mentioned, a classification model in accordance with aspects described herein can be trained to discern a cost category for a code sequence among a group of cost categories. In particular, the classification model can be trained to perform a multi-class classification task in response to being applied to both a code sequence corresponding to program code and a vector representing usage charge for the program code. Such a classification model can embody the classification model 132, for example.

Such a classification model can be trained on large amounts of labeled data using machine-learning techniques. Examples of elements of a dataset of the labeled data are shown in FIG. 5. The dataset of the labeled data can include program code 510, charge feature vectors 520, and labels 530. The program code 510 includes different arrangements of program code. In some cases, as is illustrated in FIG. 5, the dataset also can include data 540 defining a typical cost or data 550 defining an actual cost, or both, to execute program code at a computing platform that provides a cloud computing service. The typical cost can be dictated by a developer device that provides one or many APIs to access the cloud computing service. The actual cost can be determined by a metering system at the computing platform.

Figure 6:
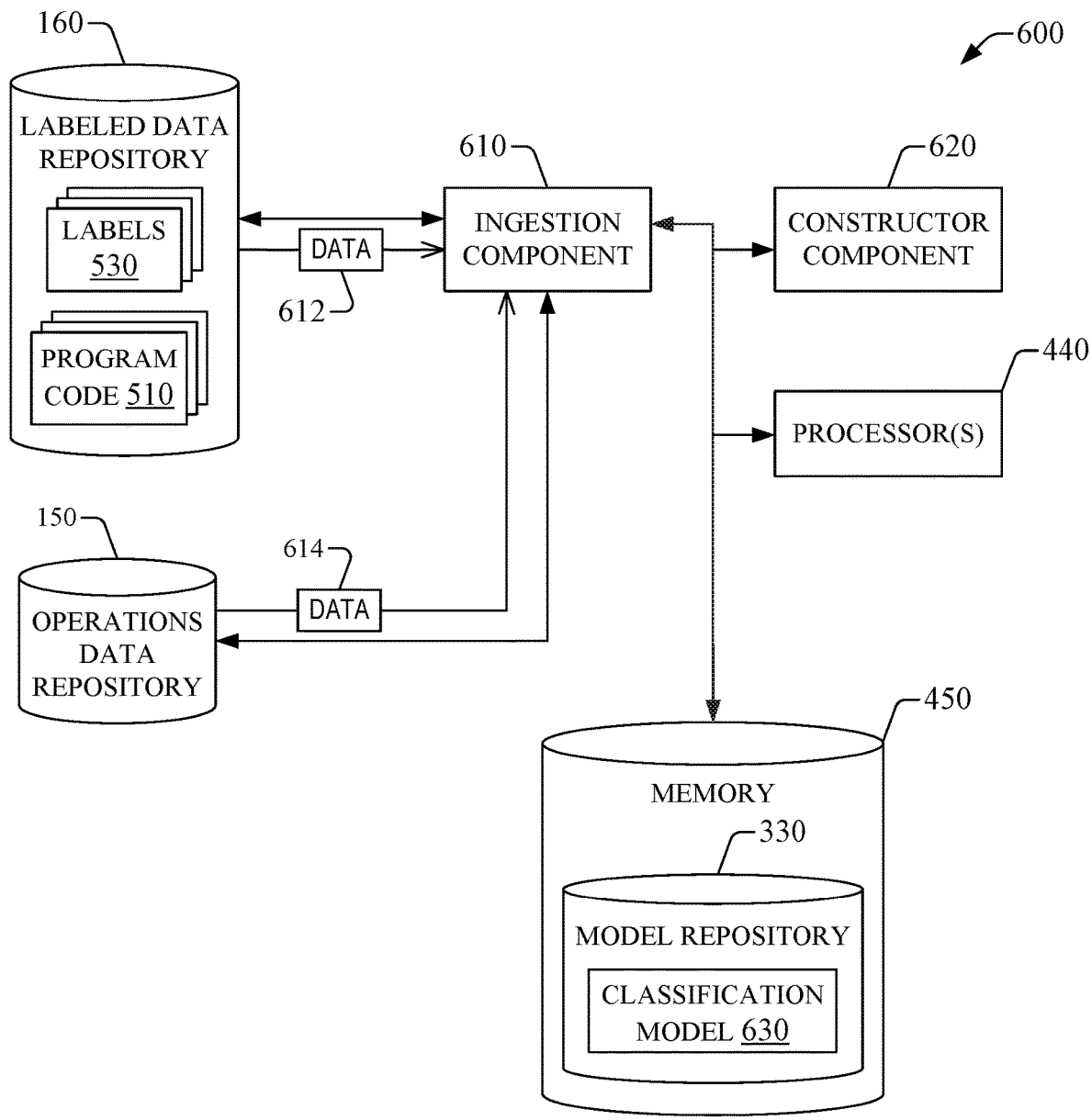
FIG. 6 illustrates a non-limiting example of a computing system for generation of a classification model to designate program code as pertaining to one or multiple cost categories, in accordance with one or more embodiments described herein.

At least one of the labels 530 can be configured using data 560 from a reviewer device (e.g., an expert reviewer device or a crowdsourcing device). The data 560 from the reviewer device can indicate a comment characterizing the efficiency of program code. Accordingly, a positive comment can result in a label indicating efficient code and a negative comment can result in another label indicating inefficient code. A negative comment can be referred to as an "anti-pattern" comment because such a comment can indicate an inadequate pattern of usage of the cloud computing service. As is illustrated in FIG. 5, program code 512 (also shown in FIG. 2A) can have a "High" label indicating that the program code 512 pertains to the "High" category. The program code 512 (e.g., a snippet) calls object store in every epoch, loads data, and discards the data. Here, an epoch refers to an iteration in the training of a machine-learning model (e.g., classification model 132 (FIG. 1)), for example. It is noted that alternative, more efficient code could cache the data instead of repeatedly loading the data, with the ensuing increasing cloud cost. Program code 514 also can have a "High" label. In contrast, program code 516 (also shown in FIG. 2B) can have a "Normal" label indicating that the program code 516 pertains to a "Normal" category. In some embodiments, as is illustrated in FIG. 6, program code 510 and labels 530 can be retained in the labeled data repository 160 and charge feature vectors 520 can be retained in the operations data repository 150. It is noted that in some embodiments, the labeled data repository 160 can retain code sequences instead, or in addition to, program code 510. In those cases, the labels 530 correspond to respective code sequences retained in the labeled data repository 160. In some cases, the program code 510 and the labels 530 can be included in the program code 168 (FIG. 1) and labels 164 (FIG. 1), respectively.

The computing system 600 includes an ingestion component 610 that can obtain different types of training data to generate a classification model 630 in accordance with aspects described herein. The ingestion component 610 need not be the same as the ingestion component 310 (FIG. 3). Because the classification model 630 can be generated to implement a classification task, the ingestion component 610 can obtain labeled data 612 from the labeled data repository 160. The labeled data 612 can include first data defining program code and second data defining a label for the program code, wherein the label designates the program code as pertaining to a cost category from a defined group of cost categories. In some cases, such a label can include one or a combination of a textual element, a graphical element, or an aural element. In addition, the ingestion component 610 also can obtain data 614 from the operations data repository 150. The data 614 can include a charge feature vector corresponding to program code identified in the labeled data 612. Accordingly, the ingestion component 610 can obtain a training dataset as is described in connection with FIG. 5.

The computing system 600 also includes a constructor component 620 that can operate on the training dataset obtained by the ingestion component 610. By operating on the training dataset, the constructor component 620 can train the classification model using the data 612 and the data 614 included in the training dataset. As mentioned, the classification model 630 can be trained to classify particular program code as pertaining to one of a defined group of cost categories (e.g., "Low," "Normal," "Moderate," and "High").

To train the classification model, the constructor component 620 can determine, using the data 612 and the data 614, a solution to an optimization problem with respect to a prediction error function. Such a function yields a value based on an evaluation of differences between known labels for respective program codes and predicted labels for the respective program codes, where the predicted labels are generated by applying a current iteration of the classification model 630 to program code and a charge features vector. The solution to the optimization problem arises from converging to a set of model parameters that minimizes the prediction error function. The set of model parameters defines a trained classification model 630. The constructor component 620 can retain the trained classification model 630 in the model repository 330.

Figure 7:
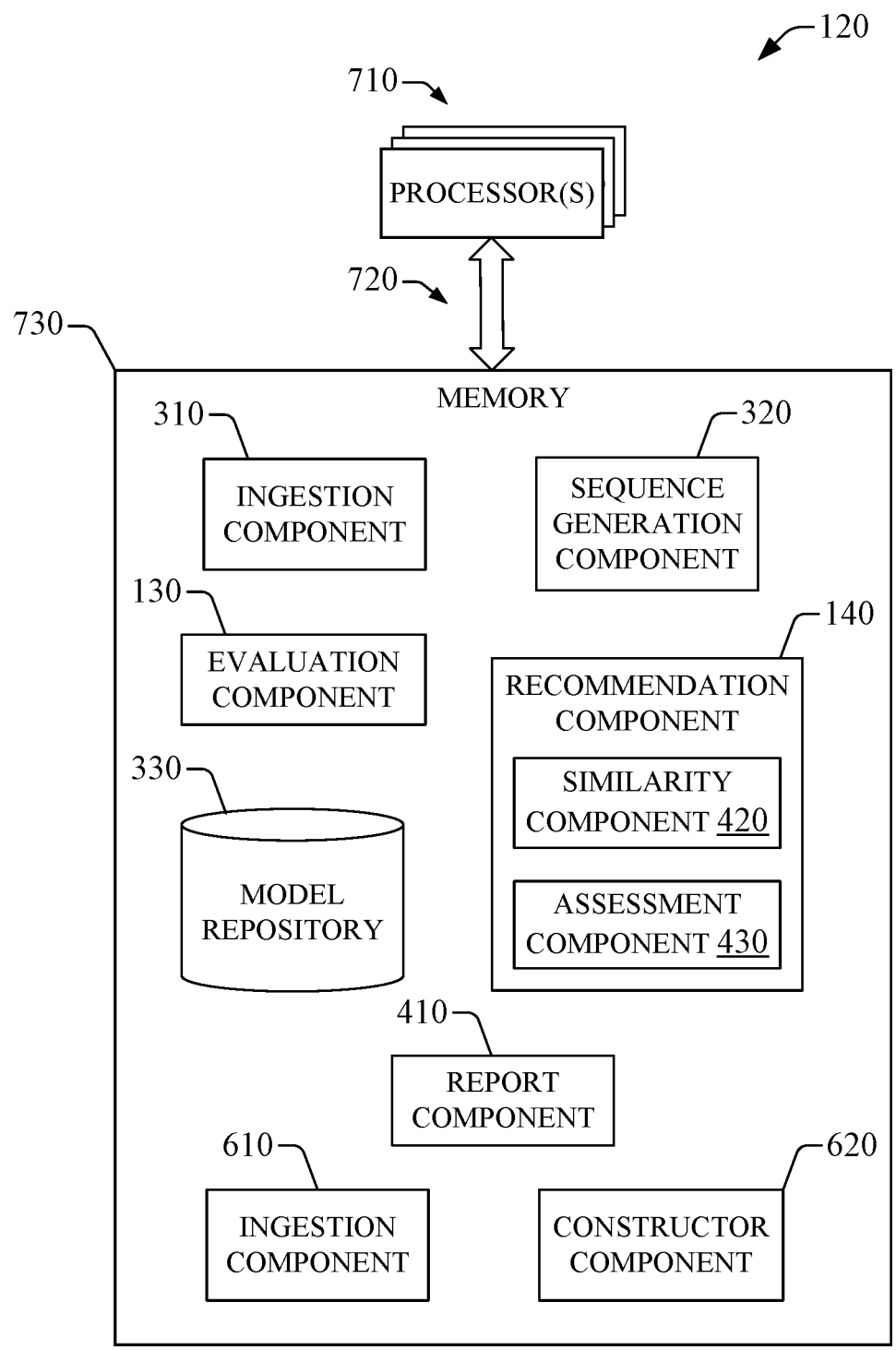
FIG. 7 illustrates a non-limiting example of another computing system for intelligent recommendations for program code, in accordance with one or more embodiments described herein.

FIG. 7 is a block diagram of a non-limiting example of the recommendation system 120 in accordance with one or more embodiments described herein. As is illustrated in FIG. 7, the recommendation system 120 can include one or many processors 710 and one or many memory devices 730 (referred to as memory 730). In some embodiments, the processor(s) 710 can be arranged in a single computing apparatus (a blade server device or another type of server device, for example). In other embodiments, the processor(s) 710 can be distributed across two or more computing apparatuses (e.g., multiple blade server devices or other types of server devices).

The one or many processors 710 can be operatively coupled to the memory 730 by one or many communication interfaces 720, for example. The communication interface(s) 720 can be suitable for the particular arrangement (localized or distributed) of the processor(s) 710. In some embodiments, the communication interface(s) 720 can include one or many bus architectures, such an Ethernet-based industrial bus, a controller area network (CAN) bus, a Modbus, other types of fieldbus architectures, or the like. In addition, or in other embodiments, the communication interface(s) can include a wireless network and/or a wireline network having respective footprints.

As is illustrated in FIG. 7, the memory 730 can retain or otherwise store therein machine-accessible components (e.g., computer-readable and/or computer-executable components) in accordance with embodiments of this disclosure. As such, in some embodiments, machine-accessible instructions (e.g., computer-readable and/or computer-executable instructions) embody or otherwise constitute each one of the machine-accessible components within the memory 730. The machine-accessible instructions are encoded in the memory 730 and can be arranged to form each one of the machine-accessible components. The machine-accessible instructions can be built (e.g., linked and compiled) and retained in computer-executable form in the memory 730 or in one or many other machine-accessible non-transitory storage media. Specifically, as is shown in FIG. 7, in some embodiments, the machine-accessible components include the ingestion component 310; the sequence generation component 320; the evaluation component 130; the recommendation component 140, including the similarity component 420 and the assessment component 430; the report component 410, the ingestion component 610; and the constructor component 620. As is also shown in FIG. 7, the memory 730 also can include the model repository 330 and at least some of the data retained therein.

The machine-accessible components, individually or in a particular combination, can be accessed and executed by at least one of the processor(s) 710. In response to execution, each one of the machine-accessible components can provide the functionality described herein. Accordingly, execution of the machine-accessible components retained in the memory 730 can cause the recommendation system 120 to operate in accordance with aspects described herein. More concretely, at least one of the processor(s) 710 can execute the machine-accessible components to cause the recommendation system 120 to permit the identification of program code as pertaining to a particular cost category from a group of cost categories and, in some cases, permit the generation of a recommendation for program code in another cost category, in accordance with aspects of this disclosure.

Although not illustrated in FIG. 7, the recommendation system 120 also can include other types of computing resources that can permit or otherwise facilitate the execution of the machine-accessible components retained in the memory 730. Those computing resources can include, for example, central processing units (CPUs), graphics processing units (GPUs), tensor processing units (TPUs), memory, disk space, incoming bandwidth, and/or outgoing bandwidth, interface(s) (such as I/O interfaces); controller devices(s); power supplies; and the like. For instance, the memory 730 also can include programming interface(s) (such as APIs); an operating system; software for configuration and or control of a virtualized environment; firmware; and the like.

Figure 8:
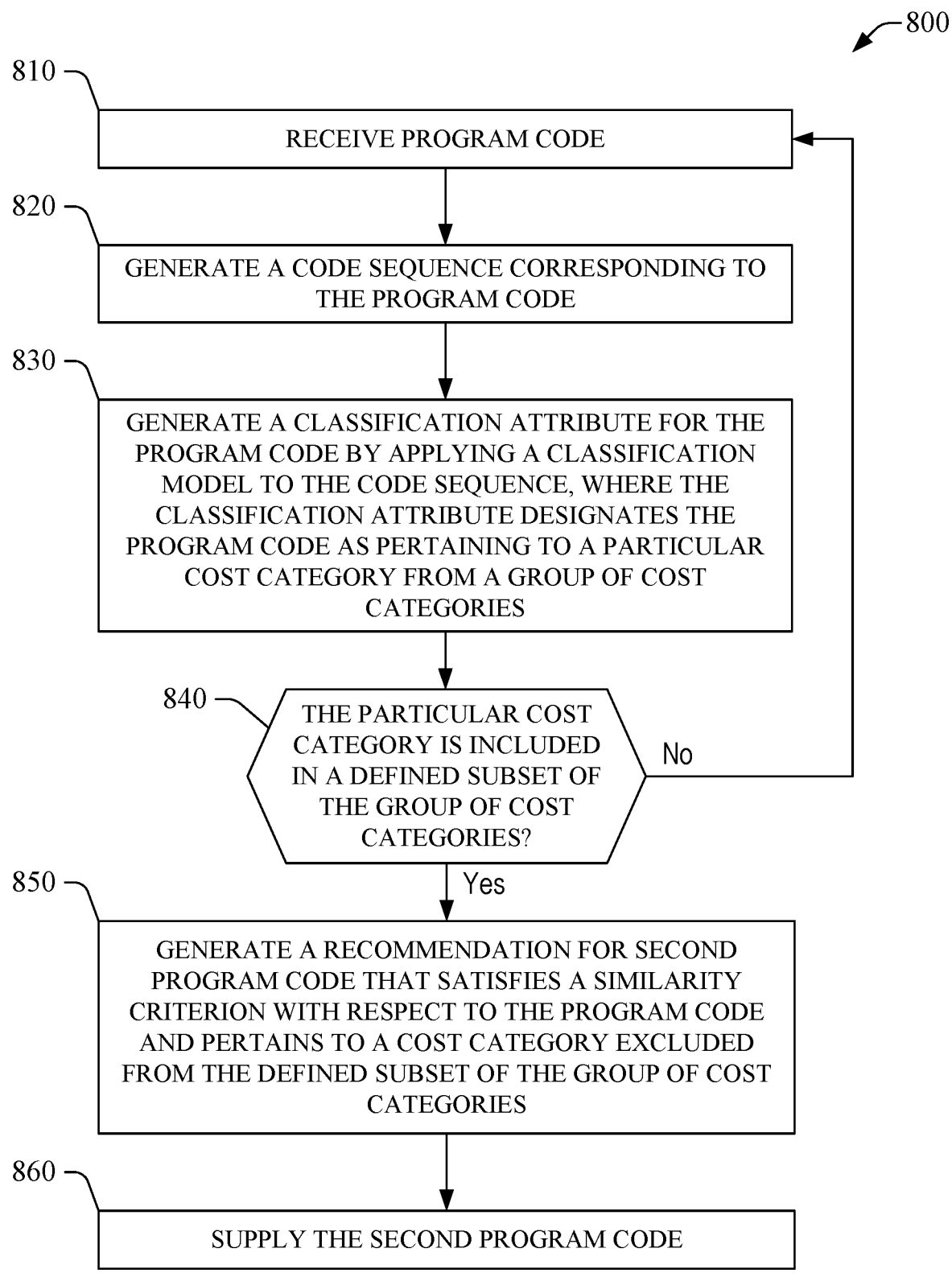
FIG. 8 is a flowchart of a non-limiting example of a computer-implemented method for providing intelligent recommendations for program code, in accordance with one or more embodiments described herein.

FIG. 8 is a flowchart of a non-limiting example of a computer-implemented method 800 for providing intelligent recommendations for program code, in accordance with one or more embodiments described herein. A computing system can implement, at least partially, the computer-implemented method 800. Implementing the computer-implemented method 800 can include compiling or executing, or both, one or several of the blocks included in the computer-implemented method 800, for example. The computing system can include and/or can be operatively coupled to one or many processors, one or more memory devices, other types of computing resources (such as communication interface(s)), a combination thereof, or similar. In some embodiments, the computing system can be embodied in, or can constitute, the recommendation system 120 (FIG. 1) in accordance with the various embodiments disclosed herein.

At block 810, the computing system can receive program code. As an example, the program code can be received by the ingestion component 310 (FIG. 3). The program code can constitute a reusable segment of program code or another type of reusable component, for example. Specifically, in one example, the program code can be embodied in the program code 104 (FIG. 1). In some embodiments, the program code can be received from a user device (such as the user device 110).

At block 820, the computing system can generate a code sequence corresponding to the program code. For example, the code sequence can be embodied in the code sequence 314 (FIG. 3). In some embodiments, the code sequence can be generated via the sequence generator component 320 (FIG. 3). For example, the computing system can execute the sequence generator component 310 to generate the code sequence.

At block 830, the computing system can generate a classification attribute for the program code by applying a classification model to both the code sequence and a vector representing usage charges (e.g., 4-tuple u described above). In some cases, the classification attribute can be generated by the classification component 132 (FIG. 1). To that end, in one example, the computing system can execute the evaluation component 130 (FIG. 1) to generate the classification attribute. The classification attribute can designate the program code as pertaining to a particular cost category from a group of cost categories. For example, as is described herein, the group of cost categories can include a "Low" category, a "Normal" category, a "Moderate" category, and a "High" category. In some cases, the particular cost category can be the "High" category.

At block 840, the computing system can determine if the particular cost category is included in a defined subset of the group of cost categories. Continuing with the example above, in some cases the defined subset of the group of cost categories can include the "Moderate" category and the "High" category. In case the particular cost category is the "Moderate" category or the "High" category, the computing system can ascertain that the particular category is included in the defined subset of the group of cost categories. In the alternative, in case the particular cost category is the "Low" category or the "Normal" category, the computing system can ascertain that the particular category is excluded from the defined subset of the group of cost categories.

Regardless of the composition of the defined subset of the group of cost categories, a negative determination at block 840 results in the flow of the example computer-implemented method 800 returning to block 810, for example. By returning to block 810, other program code be received and evaluated according to block 820 and block 830. In the alternative, a positive determination at block 840 results in the flow of the example computer-implemented method 800 continuing to block 850. At block 850, the computing system can generate a recommendation for second program code that satisfies a similarity criterion with respect to the program code and pertains to a cost category excluded from the defined subset of the group of cost categories. In some cases, the second program code can constitute a second reusable segment of program code.

At block 860, the computing system can supply the second program code. In some embodiments, supplying the second program code can include sending the second program code to the user device that provided the program code.

Figure 9:
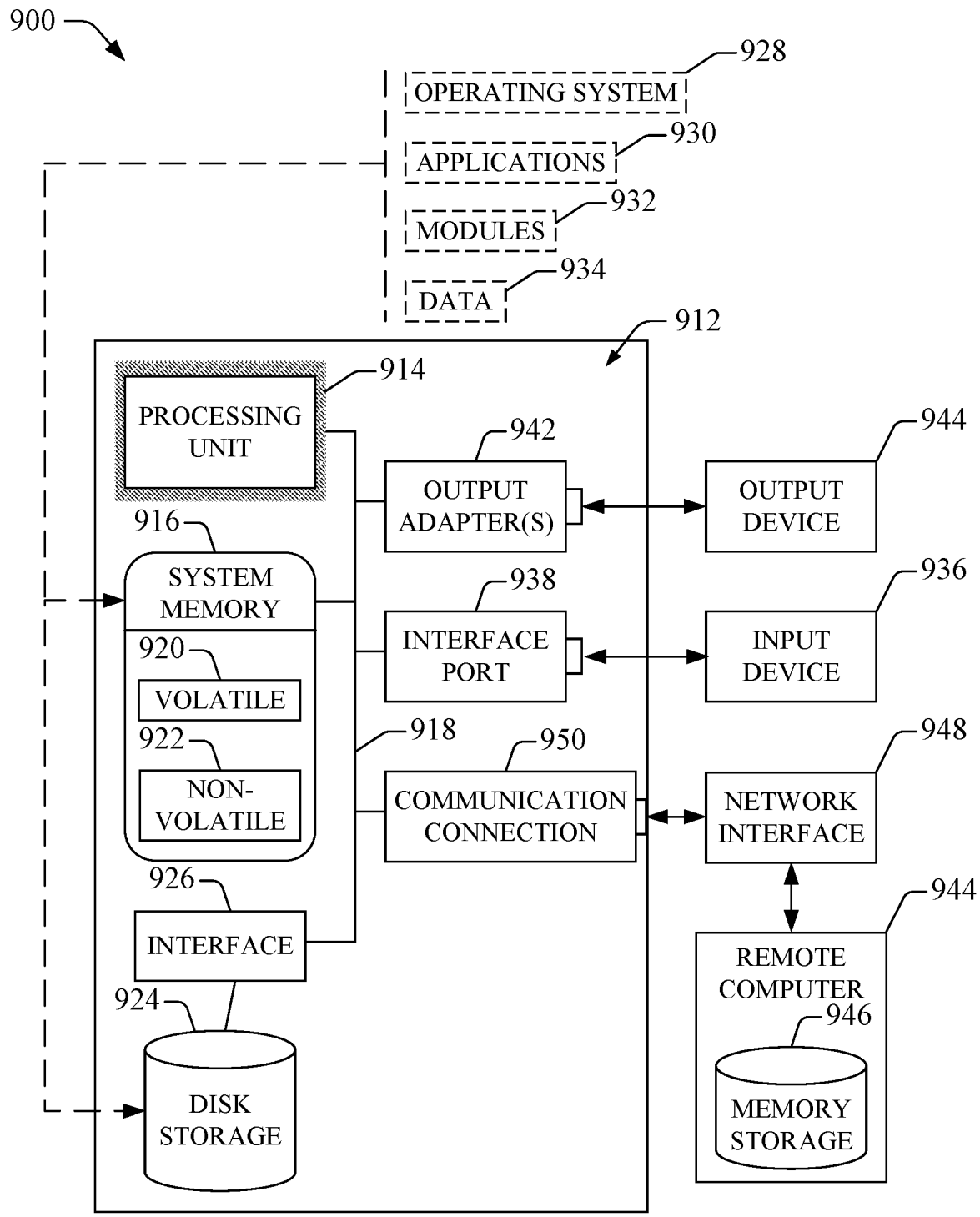
FIG. 9 is a block diagram of a non-limiting example of an operating environment in which one or more embodiments described herein can be implemented.

In order to provide a context for the various aspects of the disclosed subject matter, FIG. 9 as well as the following discussion are intended to provide a general description of a suitable environment in which the various aspects of the disclosed subject matter can be implemented. FIG. 9 illustrates a block diagram of an example, non-limiting operating environment in which one or more embodiments described herein can be facilitated. Repetitive description of like elements employed in other embodiments described herein is omitted for sake of brevity. With reference to FIG. 9, a suitable operating environment 900 for implementing various aspects of this disclosure can include a computer 912. The computer 912 can also include a processing unit 914, a system memory 916, and a system bus 918. The system bus 918 can operably couple system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 916 can also include volatile memory 920 and nonvolatile memory 922. The basic input/output system (BIOS), containing the basic routines to transfer information between elements within the computer 912, such as during start-up, can be stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM.

Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface can be used, such as interface 926. FIG. 9 also depicts software that can act as an intermediary between users and the basic computer resources described in the suitable operating environment 900. Such software can also include, for example, an operating system 928. Operating system 928, which can be stored on disk storage 924, acts to control and allocate resources of the computer 912. System applications 930 can take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through one or more input devices 936. Input devices 936 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 914 through the system bus 918 via one or more interface ports 938. The one or more Interface ports 938 can include, for example, a serial port, a parallel port, a game port, and a universal serial bus (USB). One or more output devices 940 can use some of the same type of ports as input device 936. Thus, for example, a USB port can be used to provide input to computer 912, and to output information from computer 912 to an output device 940. Output adapter 942 can be provided to illustrate that there are some output devices 940 like monitors, speakers, and printers, among other output devices 940, which require special adapters. The output adapters 942 can include, by way of illustration and not limitation, video and sound cards that provide a means of connection between the output device 940 and the system bus 918. It should be noted that other devices and/or systems of devices provide both input and output capabilities such as one or more remote computers 944.

Computer 912 can operate in a networked environment using logical connections to one or more remote computers, such as remote computer 944. The remote computer 944 can be a computer, a server, a router, a network PC, a workstation, a microprocessor based appliance, a peer device or other common network node and the like, and typically can also include many or all of the elements described relative to computer 912. For purposes of brevity, only a memory storage device 946 is illustrated with remote computer 944. Remote computer 944 can be logically connected to computer 912 through a network interface 948 and then physically connected via communication connection 950. Further, operation can be distributed across multiple (local and remote) systems. Network interface 948 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

Figure 10:
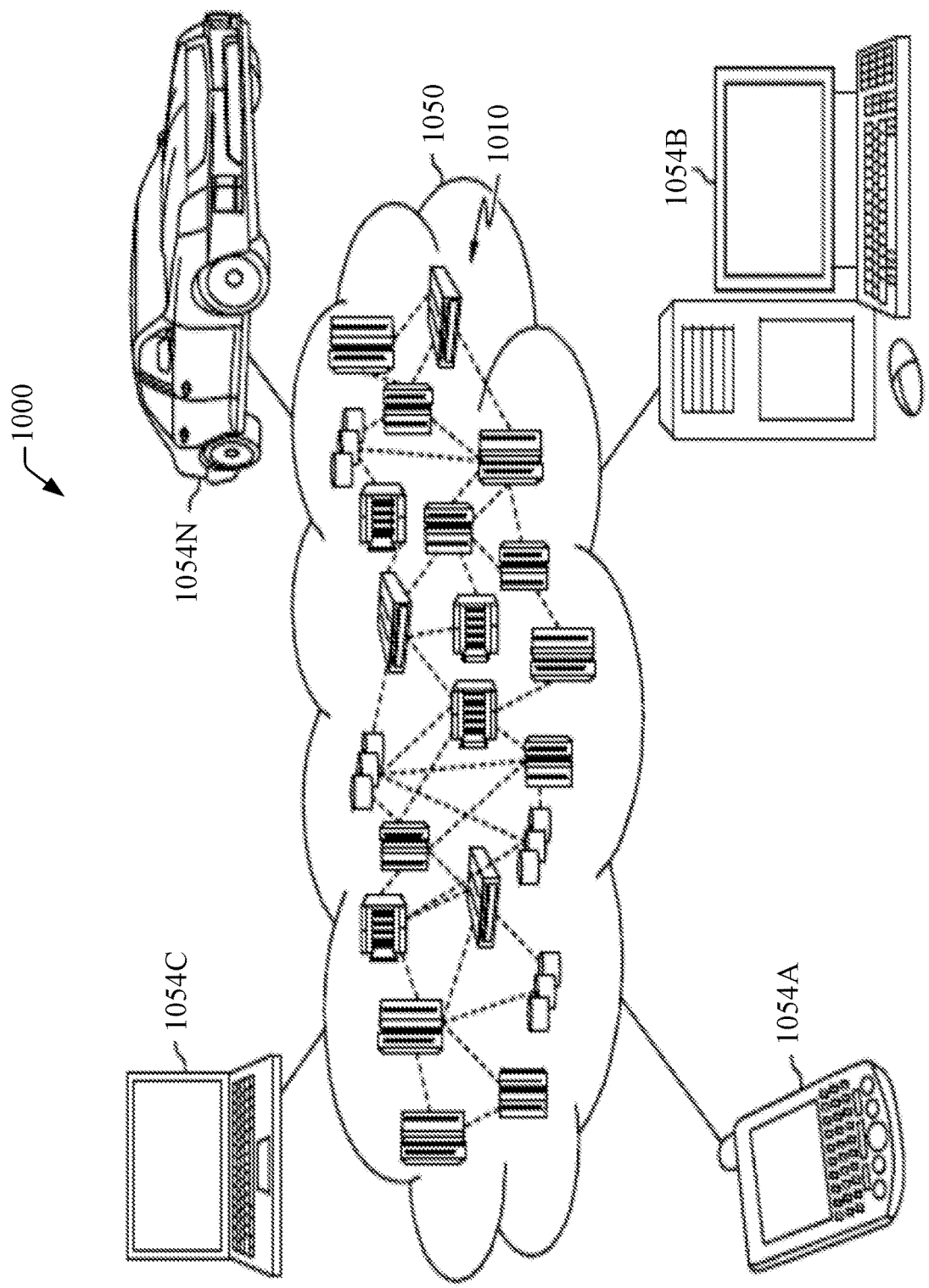
FIG. 10 is a block diagram of a non-limiting example of a cloud computing environment in accordance with one or more embodiments described herein.

In some cases, the various embodiments of recommendation system 120 described herein can be associated with a cloud computing environment. For example, the recommendation system 120 can be associated with cloud computing environment 1050 as is illustrated in FIG. 10 and/or one or more functional abstraction layers described herein with reference to FIG. 11 (e.g., hardware and software layer 1160, virtualization layer 1170, management layer 1180, and/or workloads layer 1190).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 10 an illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Although not illustrated in FIG. 10, cloud computing nodes 1010 can further comprise a quantum platform (e.g., quantum computer, quantum hardware, quantum software, and/or another quantum platform) with which local computing devices used by cloud consumers can communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
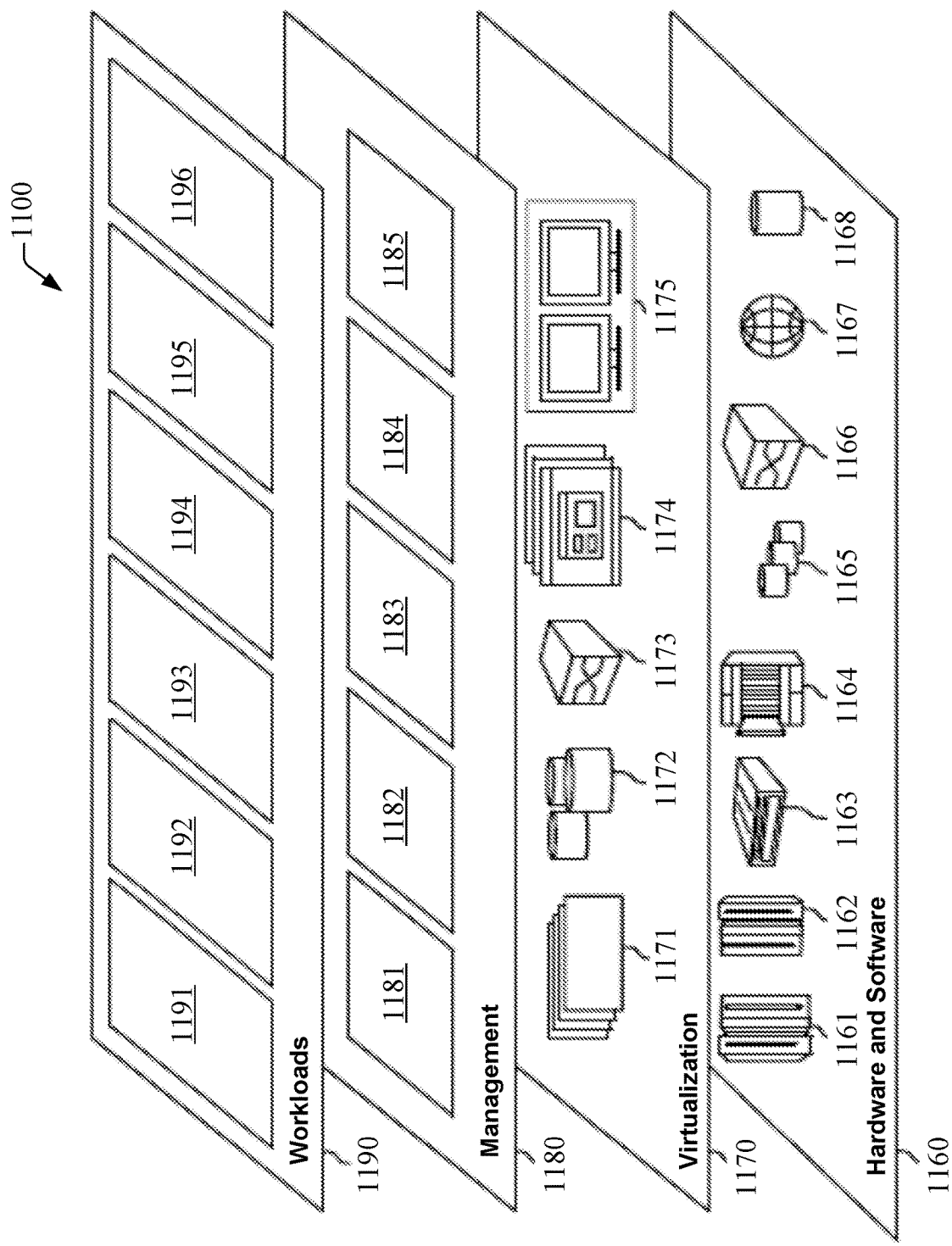
FIG. 11 is a block diagram of a non-limiting example of abstraction model layers in accordance with one or more embodiments described herein.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 include hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167, database software 1168, quantum platform routing software (not illustrated in FIG. 11), and/or quantum software (not illustrated in FIG. 11).

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Non-limiting examples of workloads and functions which may be provided from this layer include: mapping and navigation 1191; software development and lifecycle management 1192; virtual classroom education delivery 1193; data analytics processing 1194; transaction processing 1195; and vulnerability risk assessment software 1196.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

In this disclosure, terms such as "store," "storage," "data store," "data storage," "database," "repository," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor that executes computer-executable components stored in memory, the computer-executable components comprising,
      an evaluation component that determines that first program code pertains to a defined category representing a defined cost to execute the first program code by a cloud computing service;
      a recommendation component that generates a recommendation for second program code that satisfies a similarity criterion with respect to the first program code, the second program code pertaining to a category representing a cost to execute the second program code by the cloud computing service, wherein the cost is less than the defined cost; and
      a report component that sends a notification about the second program code, wherein the notification comprises formatting information defining a text attribute to display the text at a display device.

2. The system of claim 1, wherein the first program code comprises a first reusable segment of program code and the second program code comprises a second reusable segment of program code.

3. The system of claim 1, wherein the notification is of the second program code being available.

4. The system of claim 3, wherein the notification comprises text identifying the category, the text attribute being specific to the category.

5. The system of claim 4, wherein the report component further sends a notification of the first program code pertaining to the defined category, and wherein the notification comprises second text identifying the defined category and further comprises second formatting information defining a second text attribute to display the second text at the display device, the second text attribute being specific to the defined category.

6. The system of claim 1, wherein the similarity criterion dictates that a similarity metric is greater than a threshold value, the similarity metric comprising one of a defined number of words in bag-of-words model or a defined Euclidean distance in an embeddings space, and wherein the computer-executable components further comprise,
- a similarity component that determines the similarity metric for the second program code; and
- an assessment component that compares the similarity metric to the threshold value.

7. The system of claim 1, wherein the evaluation component that generates a classification attribute designating the first program code as pertaining to the defined category, and wherein the evaluation component generates the classification attribute by,
- receiving a code sequence corresponding to the first program code;
- receiving a vector identifying a cost model to access the cloud computing service, the cost model being retained in a customized data repository;
- generating multiple weights by applying a machine-learning model to the code sequence and the vector, wherein a first weight of the multiple weights represents a probability that the code sequence pertains to a first particular category representing a particular cost for accessing the cloud computing service, and wherein a second weight of the multiple weights represents a probability that the code sequence pertains to a second particular category representing a second particular cost for accessing the cloud computing service;
- determining that a largest weight of the multiple weights corresponds to the defined category; and
- assigning the classification attribute to a label identifying the defined category.

8. The system of claim 7, wherein applying the machine-learning model comprises applying a bidirectional encoder representations for transformers (BERT) model to the code sequence and the vector.

9. A computer-implemented method, comprising:
- determining, by a computing system operatively coupled to a processor, that first program code pertains to a defined category representing a defined cost to execute the first program code by a cloud computing service;
- generating, by the computing system, a recommendation for second program code that satisfies a similarity criterion with respect to the first program code, the second program code pertaining to a category representing a cost to execute the second program code by the cloud computing service, wherein the cost is less than the defined cost; and
- sending, by the computing system, a notification about the second program code to a user device, wherein the sending comprises sending formatting information defining a text attribute to display the text at a display device.

10. The computer-implemented method of claim 9, further comprising sending, by the computing system, the second program code to a user device.

11. Computer-implemented method of claim 9, wherein the notification is of the second program code being available.

12. The computer-implemented method of claim 11, wherein the sending further comprises:
- sending text identifying the category
- the text attribute being specific to the category.

13. The computer-implemented method of claim 12, further comprising sending a second notification of the first program code pertaining to the defined category, wherein the sending the second notification comprises:
- sending second text identifying the defined category; and
- sending second formatting information defining a second text attribute to display the second text at the display device, the second text attribute being specific to the defined category.

14. The computer-implemented method of claim 9, wherein the similarity criterion dictates that a similarity metric exceeds a threshold value, the similarity metric comprising one of a defined number of words in bag-of-words model or a defined Euclidean distance in an embeddings space, and wherein the generating comprises:
- determining the similarity metric for the second program code; and
- determining that the similarity metric exceeds the threshold value.

15. The computer-implemented method of claim 9, further comprising generating, by the computing system, a classification attribute that designates the first program code as pertaining to the defined category.

16. A computer program product for provision of recommendations for program code, the computer program product comprising a computer-readable storage medium having program instructions embodied therewith, the program instructions executable by a processor to cause the processor to:
- determine, by the processor, that first program code pertains to a defined category representing a defined cost to execute the first program code by a cloud computing service; and
- generate, by the processor, a recommendation for second program code that satisfies a similarity criterion with respect to the first program code, the second program code pertaining to a category representing a cost to execute the second program code by the cloud computing service, wherein the cost is less than the defined cost, wherein the similarity criterion dictates that a similarity metric exceeds a threshold value, the similarity metric comprising one of a defined number of words in bag-of-words model or a defined Euclidean distance in an embeddings space.

17. The computer program product of claim 16, wherein the computer-executable instructions are further executable to cause the processor to send the second program code to a user device.

18. The computer program product of claim 16, wherein the computer-executable instructions are further executable to cause the processor to send a notification of the second program code.

19. The computer program product of claim 16, and wherein the computer-executable instructions are further executable to cause the processor to:
- determine, by the processor, the similarity metric for the second program code; and
- determine, by the processor, that the similarity metric exceeds the threshold value.

20. The computer program product of claim 16, wherein the computer-executable instructions are further executable to cause the processor to generate a classification attribute that designates the first program code as pertaining to the defined category.

* * * * *